United States Patent
Jang et al.

(10) Patent No.: US 10,680,290 B2
(45) Date of Patent: Jun. 9, 2020

(54) ANODE, LITHIUM SECONDARY BATTERY COMPRISING SAME, BATTERY MODULE COMPRISING THE LITHIUM SECONDARY BATTERY, AND METHOD FOR MANUFACTURING ANODE

(71) Applicant: LG CHEM, LTD., Seoul (KR)

(72) Inventors: Minchul Jang, Daejeon (KR); Byoungkuk Son, Daejeon (KR); Seong Ho Lee, Daejeon (KR); Junghun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 288 days.

(21) Appl. No.: 15/510,565

(22) PCT Filed: Sep. 24, 2015

(86) PCT No.: PCT/KR2015/010119
§ 371 (c)(1),
(2) Date: Mar. 10, 2017

(87) PCT Pub. No.: WO2016/052934
PCT Pub. Date: Apr. 7, 2016

(65) Prior Publication Data
US 2017/0294688 A1    Oct. 12, 2017

(30) Foreign Application Priority Data

Sep. 29, 2014 (KR) .................. 10-2014-0130619
Sep. 29, 2014 (KR) .................. 10-2014-0130621

(51) Int. Cl.
*H01M 10/42*    (2006.01)
*H01M 2/26*    (2006.01)
(Continued)

(52) U.S. Cl.
CPC ......... *H01M 10/4235* (2013.01); *H01M 2/26* (2013.01); *H01M 4/134* (2013.01);
(Continued)

(58) Field of Classification Search
CPC ................................................. H01M 10/4235
See application file for complete search history.

(56) References Cited

U.S. PATENT DOCUMENTS

2003/0091899 A1*  5/2003  Matsubara ............. H01M 4/13
                                                     429/213
2004/0121228 A1*  6/2004  Ovshinsky ............. H01M 4/04
                                                     429/131
(Continued)

FOREIGN PATENT DOCUMENTS

CN    103490041 A    1/2014
EP    2 437 333 A1    4/2012
(Continued)

OTHER PUBLICATIONS

European Office Action for Appl. No. 15847108.6 dated May 8, 2018.
(Continued)

*Primary Examiner* — Brian R Ohara
(74) *Attorney, Agent, or Firm* — Birch, Stewart, Kolasch & Birch, LLP (57) ABSTRACT

The present specification relates to an anode, a lithium secondary battery including the same, a battery module including the lithium secondary battery, and a method for manufacturing an anode.

5 Claims, 6 Drawing Sheets (51) Int. Cl.

| | | |
|---|---|---|
| *H01M 4/134* | (2010.01) | |
| *H01M 4/36* | (2006.01) | |
| *H01M 4/38* | (2006.01) | |
| *H01M 4/48* | (2010.01) | |
| *H01M 4/525* | (2010.01) | |
| *H01M 4/80* | (2006.01) | |
| *H01M 10/0525* | (2010.01) | |

(52) U.S. Cl.
CPC ........... *H01M 4/366* (2013.01); *H01M 4/382* (2013.01); *H01M 4/386* (2013.01); *H01M 4/483* (2013.01); *H01M 4/525* (2013.01); *H01M 4/808* (2013.01); *H01M 10/0525* (2013.01); *H01M 2220/30* (2013.01); *Y02P 70/54* (2015.11); *Y02T 10/7011* (2013.01)

(56) References Cited

U.S. PATENT DOCUMENTS

| | | |
|---|---|---|
| 2006/0093871 A1 | 5/2006 | Howard et al. |
| 2007/0202408 A1 | 8/2007 | Nakanishi et al. |
| 2009/0075161 A1 | 3/2009 | Ando et al. |
| 2012/0040234 A1* | 2/2012 | Amagai .............. H01M 2/1077 429/153 |
| 2012/0107684 A1 | 5/2012 | Iwamoto et al. |
| 2013/0065122 A1* | 3/2013 | Chiang .............. H01M 4/0478 429/211 |
| 2014/0080000 A1 | 3/2014 | Han et al. |

FOREIGN PATENT DOCUMENTS

| | | | |
|---|---|---|---|
| JP | 2009-70782 | A | 4/2009 |
| JP | 2010-212092 | A | 9/2010 |
| JP | 2011-134521 | A | 7/2011 |
| JP | 2012-33280 | A | 2/2012 |
| JP | 5095863 | B2 | 12/2012 |
| JP | 2013-45984 | A | 3/2013 |
| KR | 10-2011-0019101 | A | 2/2011 |
| KR | 10-2012-0130709 | A | 12/2012 |
| WO | WO 2013/012334 | A1 | 1/2013 |
| WO | WO 2014/128844 | A1 | 8/2014 |

OTHER PUBLICATIONS

International Search Report for PCT/KR2015/010119 dated Jan. 29, 2016.
Key et al., "Real-Time NMR Investigations of Structural Changes in Silicon Electrodes for Lithium-Ion Batteries", J. Am. Chem. Soc., 2009, vol. 131, No. 26, pp. 9239-9249.
Office Action for KR 10-2015-0135698 dated Sep. 28, 2016.
Written Opinion of the International Searching Authority for PCT/KR2015/010119 dated Jan. 29, 2016.
Indian Offical Action for Appl. No. 201717007961 dated Oct. 11, 2019.

\* cited by examiner

ANODE, LITHIUM SECONDARY BATTERY COMPRISING SAME, BATTERY MODULE COMPRISING THE LITHIUM SECONDARY BATTERY, AND METHOD FOR MANUFACTURING ANODE

TECHNICAL FIELD

The present invention claims priority to and the benefit of Korean Patent Application Nos. 10-2014-0130621 and 10-2014-0130619 filed in the Korean Intellectual Property Office on Sep. 29, 2014, respectively, the entire contents of which are incorporated herein by reference.

The present specification relates to an anode, a lithium secondary battery including the same, a battery module including the lithium secondary battery, and a method for manufacturing an anode.

BACKGROUND ART

With the recent trend that electronic devices become compact and lightweight, a battery acting as a power source is also required to become compact and lightweight. As a battery which becomes compact and lightweight and capable of being charged and discharged at a high capacity, a lithium secondary battery is put into practical use, and is used for a mobile electronic device such as a small video camera, a mobile telephone, and a laptop computer, a communication device, and the like.

The lithium secondary battery is an energy storage device having high energy and power, and has an advantage in that the capacity or operating voltage is higher than that of other batteries. However, the lithium secondary battery has a problem in safety of the battery due to the high energy, and thus has a danger such as an explosion or a fire. In particular, since hybrid automobiles which have been recently in the spotlight and the like are required to have high energy and output characteristics, it can be seen that safety is most important.

In general, the lithium secondary battery is composed of a cathode, an anode, and an electrolyte, and lithium ions released from a cathode active material by a first charging serve to transfer energy while shuttling between both electrodes, like being inserted into an anode active material, that is, carbon particles and again being dissociated during the discharge, thereby making the charge and discharge possible.

Meanwhile, as a high-capacity battery is continuously needed for the development of mobile electronic devices, a high-capacity anode material having a much higher capacity per unit weight than carbon used as the existing anode material has been actively studied.

DETAILED DESCRIPTION OF THE INVENTION

Technical Problem

The present specification has been made in an effort to provide an anode, a lithium secondary battery including the same, a battery module including the lithium secondary battery, and a method for manufacturing an anode.

Technical Solution

The present specification provides an anode including a first anode including a lithium metal layer; and a second anode including a porous current collector, and silicon or silicon oxide, carbon and a binder resin, which are provided in pores of the porous current collector, in which the first anode and the second anode are electrically connected to each other.

Further, the present specification provides an anode including a first anode including a lithium metal layer; and a second anode including a porous current collector, and a lithium-silicon composite or lithium-silicon oxide composite, carbon and a binder resin, which are provided in pores of the porous current collector, in which the first anode and the second anode are electrically connected to each other.

In addition, the present specification provides an anode including a porous current collector in which silicon or silicon oxide, carbon, and a binder resin are provided in pores thereof; and a lithium metal layer provided on a surface at one side of the porous current collector and in the pores thereof.

Furthermore, the present specification provides an anode including: a porous current collector in which silicon, a lithium-silicon composite, carbon, and a binder resin are provided in pores thereof; or a porous current collector in which silicon oxide, a lithium-silicon oxide composite, carbon, and a binder resin are provided in pores thereof.

Further, the present specification provides a lithium secondary battery including the anode and a cathode, and an electrolyte provided between the anode and the cathode.

In addition, the present application provides a battery module including the lithium secondary battery as a unit cell.

Furthermore, the present specification provides a method for manufacturing an anode, the method including: preparing a first anode including a lithium metal layer; preparing a second anode including silicon or silicon oxide, carbon, and a binder resin provided in pores of a porous current collector; and electrically connecting the first anode to the second anode.

Advantageous Effects

In the anode according to an exemplary embodiment of the present specification, the chemical stability and safety of a lithium metal are improved.

The initial charge and discharge efficiency of a battery to which the anode according to an exemplary embodiment of the present specification is applied is improved.

The charge and discharge cycle characteristics of the battery to which the anode according to an exemplary embodiment of the present specification is applied are improved.

<Explanation of Reference Numerals and Symbols>

10: Cathode
20: Anode
21: First anode
22: Current collector
23: Second anode
24: Porous current collector
25: Anode separation membrane
27: Second anode including lithium-metal composite layer
30: Separation membrane
40: Connecting part
100: Porous current collector
200: Lithium metal layer
250: Lithium metal
300: Metal layer or metal oxide layer
350: Metal capable of being alloyed with lithium
400: Anode
500: Lithium-metal composite layer
550: Lithium-metal composite or lithium-metal oxide composite

BEST MODE

Hereinafter, the present specification will be described in detail.

The present specification provides an anode including: a first anode including a lithium metal layer; and a second anode including a metal layer or metal oxide layer containing a metal capable of being alloyed with lithium, in which the first anode and the second anode are electrically connected to each other.

The first anode and the second anode, which are electrically connected to each other, may be connected in series or connected in parallel. Specifically, it is preferred that the first anode and the second anode, which are electrically connected to each other, are connected in parallel.

The anode may have a thickness of 1 μm or more and 1,000 μm or less. In this case, the thickness of the anode means a sum of the thicknesses of the first anode and the second anode.

In the present specification, the anode may be used in a battery, and the anode means an electrode which releases electrons when the battery is discharged. The anode may be used for a secondary battery, and the anode means an electrode which releases electrons based on the time when the battery is discharged, and may serve as a cathode (reduction electrode) when the battery is charged.

The first anode may include a lithium metal layer, and the lithium metal layer means an electrode including a lithium metal element. A material for the lithium metal layer may be a lithium alloy, a lithium metal, an oxide of a lithium alloy, or a lithium oxide.

In an exemplary embodiment of the present specification, the lithium metal layer may be a layer composed of only a lithium metal. In this case, the lithium metal layer may partially deteriorate due to oxygen or moisture, or may include impurities.

The first anode may include a current collector provided on one surface of the lithium metal layer, or may not include a current collector.

Figure 2:
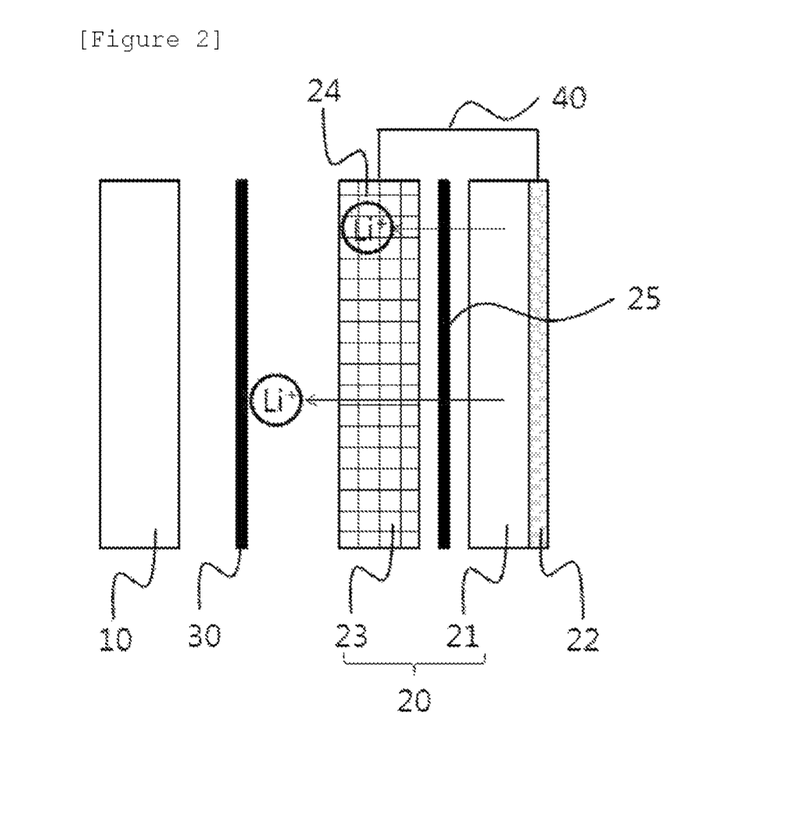
FIG. 2 illustrates the movement of lithium ions in a battery including an anode according to a second exemplary embodiment of the present specification.
Figure 3:
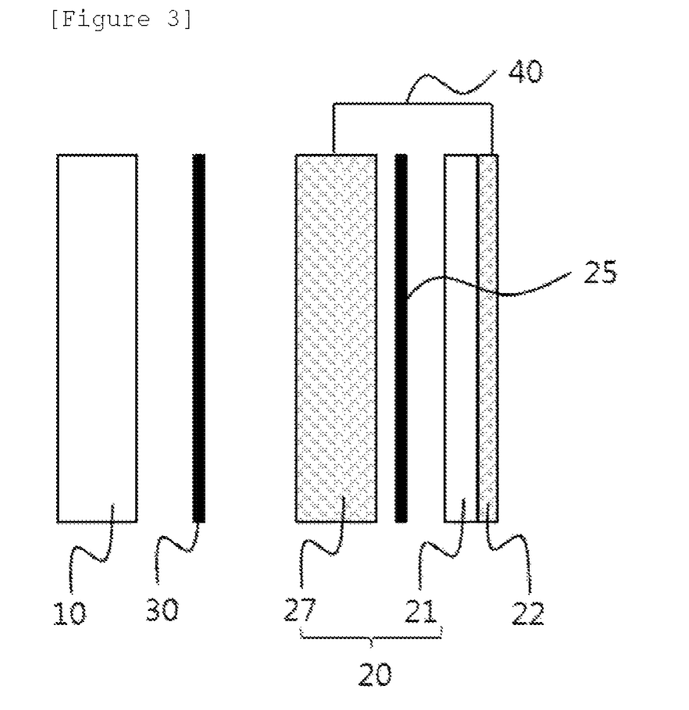
FIG. 3 is a structural view of a battery including an anode according to a third exemplary embodiment of the present specification.

As illustrated in FIG. 2, when the first anode 21 includes a current collector, a current collector 22 may be disposed at a side opposite to a side at which a second anode 23 is provided.

The current collector collects current of an anode, uses any material having electric conductivity without limitation, and may be manufactured by using materials and methods generally used in the art. For example, it is possible to use one or two or more selected from the group consisting of carbon, stainless steel, nickel, aluminum, iron, and titanium.

As a shape of the current collector, various shapes such as a film, a sheet, a foil, a net, a porous body, a foam body, or a non-woven body may be each employed.

The second anode may include a metal layer or metal oxide layer containing a metal or metal oxide capable of being alloyed with lithium. Specifically, the metal layer or metal oxide layer may contain a metal which reacts with lithium to expand the volume thereof.

The metal layer may be a layer containing a metal capable of being alloyed with lithium, and the metal oxide layer may be a layer containing a metal oxide capable of being alloyed with lithium.

A metal which the metal layer or metal oxide layer contains is not particularly limited as long as the metal is a metal capable of being alloyed with lithium, but the metal may include, for example, any one of silicon (Si), tin (Sn), germanium (Ge), and cobalt (Co); an alloy of two or more thereof; or at least one oxide thereof. The metal oxide is not particularly limited as long as the metal oxide contains at least one of silicon (Si), tin (Sn), germanium (Ge), and cobalt (Co), but the metal oxide may be, for example, silicon oxide ($SiO_2$), tin oxide ($SnO_2$), germanium oxide ($GeO_2$), cobalt oxide (CoO, $Co_2O_3$, $CoO_2$, and $Co_3O_4$), and the like.

The metal layer or metal oxide layer may include: any one of silicon, tin, and germanium; an alloy of two or more thereof; or at least one oxide thereof.

The metal layer or metal oxide layer may be a silicon layer or silicon oxide layer containing a silicon element as the metal capable of being alloyed with lithium.

The silicon layer may be formed by depositing silicon, or may be manufactured by depositing or applying a silane-based compound to form a layer, and reducing the layer. In this case, the silane-based compound may include hydrogenated silicon ($Si_nH_{2n+2}$) and an organic compound in which a hydrogen atom of the hydrogenated silicon is substituted with a hydrocarbon group, a halogen group, an alkoxy group, and a hydroxy group, and may include, for example, at least one of silane, chlorosilane, dichlorosilane, trichlorosilane, tetraalkylsilane, chlorotrialkylsilane, dichlorodialkylsilane, and trichloroalkylsilane, but the silane-based compound is not limited thereto.

The second anode may include a porous current collector and a metal or metal oxide capable of being alloyed with lithium provided inside of pores of the porous current collector.

As illustrated in FIG. 2, the second anode 23 includes a porous current collector 24, and a metal or metal oxide capable of being alloyed with lithium may be provided inside of pores of the porous current collector.

When the metal or metal oxide capable of being alloyed with lithium is silicon or silicon oxide containing a silicon element as a metal capable of being alloyed with lithium, the second anode may include a porous current collector and silicon or silicon oxide provided inside of pores of the porous current collector.

When the metal or metal oxide capable of being alloyed with lithium is silicon or silicon oxide, which contains a silicon element as a metal capable of being alloyed with lithium, the second anode may further include carbon and a binder resin. Specifically, the second anode may include a porous current collector, and silicon or silicon oxide, carbon, and a binder resin provided in pores of the porous current collector.

When the second anode includes silicon or silicon oxide provided in pores of a porous current collector, a composition of silicon or silicon oxide may be impregnated in pores of the porous current collector by a method for manufacturing the second anode. In this case, the composition may include silicon or silicon oxide, carbon, a binder resin, and a solvent.

The kinds of carbon, binder resin, and solvent are not particularly limited, but it is possible to employ those generally used in the art. For example, the binder resin may include polyvinylidene fluoride (PVdF), and the carbon may be one or two or more selected from the group consisting of graphene, graphite, carbon black, carbon nanotubes, carbon fiber, and activated carbon. The carbon black may be acetylene black, Denka black, Ketjen black, or carbon black.

Based on the total weight of the solid content of the composition, the content of the silicon or silicon oxide may be 50 wt % or more and 90 wt % or less, the content of the carbon may be 1 wt % or more and 40 wt % or less, and the content of the binder resin may be 1 wt % or more and 20 wt % or less.

As illustrated in FIG. 2, when a second anode 23 includes a porous current collector 24, lithium ions transferred from a first anode 21 may react with a metal capable of being alloyed with lithium in the second anode 23 to form a lithium-metal composite, or may pass through the second anode 23 to be transferred to an electrolyte and a cathode 10.

In the anode, the content of a lithium-metal composite formed by alloying the metal or metal oxide with lithium may be affected by the content of the metal or metal oxide capable of being alloyed with lithium. A part or all of the metal or metal oxide capable of being alloyed with lithium included in the anode may be alloyed with lithium to form a lithium-metal composite.

When the metal layer or metal oxide layer is a silicon layer or silicon oxide layer containing a silicon element as the metal or metal oxide capable of being alloyed with lithium, the weight ratio of a lithium element of the first anode to a silicon element of the second anode in the anode may be 10 to 130:100.

In the anode, the content of a lithium-silicon composite or lithium-silicon oxide composite formed by alloying the silicon or silicon oxide with lithium may be affected by the content of the silicon or silicon oxide. A part or all of the silicon included in the anode may be alloyed with lithium to form a lithium-silicon composite or lithium-silicon oxide composite.

The second anode may further include a lithium-silicon composite or lithium-silicon oxide composite.

When the second anode includes a porous current collector, the second anode may further include a lithium-silicon composite or lithium-silicon oxide composite provided in pores of the porous current collector.

The lithium-silicon composite may be represented by the following Chemical Formula 1, and the lithium-silicon oxide composite may be represented by the following Chemical Formula 2.

$Li_xSi$ [Chemical Formula 1]

$Li_oSiO_p$ [Chemical Formula 2]

In Chemical Formulae 1 and 2, x is a real number of 1.0 to 4.0, o is each a real number of 0.3 to 4.0, and p is each a real number of 0.1 to 2.0.

The porous current collector collects current of an anode, uses any material having electric conductivity without limitation, and may be manufactured by using materials and methods generally used in the art. For example, it is possible to use one or two or more selected from the group consisting of carbon, stainless steel, nickel, aluminum, iron, and titanium.

The porous current collector may be a porous metal foam.

The present specification provides an anode including: a first anode including a lithium metal layer; and a second anode including a lithium-metal composite layer containing a lithium-metal composite or lithium-metal oxide composite in which a metal or metal oxide capable of being alloyed with lithium is alloyed with lithium, in which the first anode and the second anode are electrically connected to each other.

The lithium-metal composite layer may be a lithium-silicon composite layer containing a silicon element as a metal or metal oxide capable of being alloyed with lithium.

The lithium-silicon composite layer may include a lithium-silicon composite or lithium-silicon oxide composite. Specifically, the lithium-silicon composite layer may include a lithium-silicon composite represented by the following Chemical Formula 1 or a lithium-silicon oxide composite represented by the following Chemical Formula 2.

$Li_xSi$ [Chemical Formula 1]

$Li_oSiO_p$ [Chemical Formula 2]

In Chemical Formulae 1 and 2, x is a real number of 1.0 to 4.0, o is each a real number of 0.3 to 4.0, and p is each a real number of 0.1 to 2.0.

The present specification provides an anode including a first anode including a lithium metal layer; and a second anode including a porous current collector, and a lithium-silicon composite or lithium-silicon oxide composite, carbon and a binder resin, which are provided in pores of the porous current collector, in which the first anode and the second anode are electrically connected to each other.

The overlapped explanation on the anode including the lithium-silicon composite will be omitted, and those described above may be cited.

The lithium-silicon composite layer may include the lithium-silicon composite represented by Chemical Formula 1 or the lithium-silicon oxide composite represented by Chemical Formula 2.

The lithium-silicon composite layer may further include an anode separation membrane provided between the first anode and the second anode.

The anode separation membrane may employ a separation membrane generally used in the art, and may be, for example, a non-conductive porous membrane or an insulating porous membrane.

The anode may further include a connecting part which connects the first anode and the second anode in series or in parallel. The connecting part may be a conducting wire which may electrically connect a first anode and a second anode in a battery, a material for the connecting part is not limited as long as current is flowing through the material, and a material generally used in the art may be selected.

Figure 1:
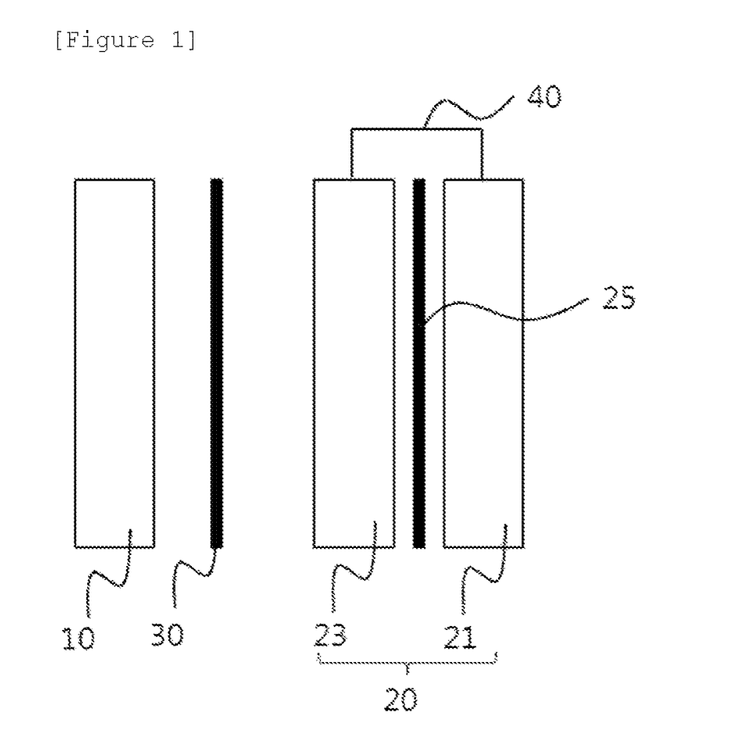
FIG. 1 is a structural view of a battery including an anode according to a first exemplary embodiment of the present specification.

The connecting part may connect the first anode and the second anode in parallel in the battery. Specifically, as illustrated in FIGS. 1 and 2, the connecting part 40 may connect a first anode 21 and a second anode 23 in parallel, but is not limited thereto.

A lithium metal is a material which is highly reactive with moisture, and thus may react with moisture, thereby making the surface of the lithium metal electrode deteriorate, or forming dendritic crystals on the surface of the lithium metal electrode.

However, the anode of the present specification includes a second anode to have an advantage in that the chemical safety and stability of a lithium metal of a lithium metal electrode being a first anode are improved.

The present specification provides an anode including: a porous current collector including a metal or metal oxide containing a metal capable of being alloyed with lithium provided inside of pores thereof; and a lithium metal layer provided on a surface at one side of the porous current collector and in the pores thereof. In other words, the present specification provides an anode including: a porous current collector; a lithium metal layer provided inside of pores at one side of the porous current collector; and a metal layer or metal oxide layer containing a metal capable of being alloyed with lithium provided inside of pores at the other side of the porous current collector.

Figure 5:
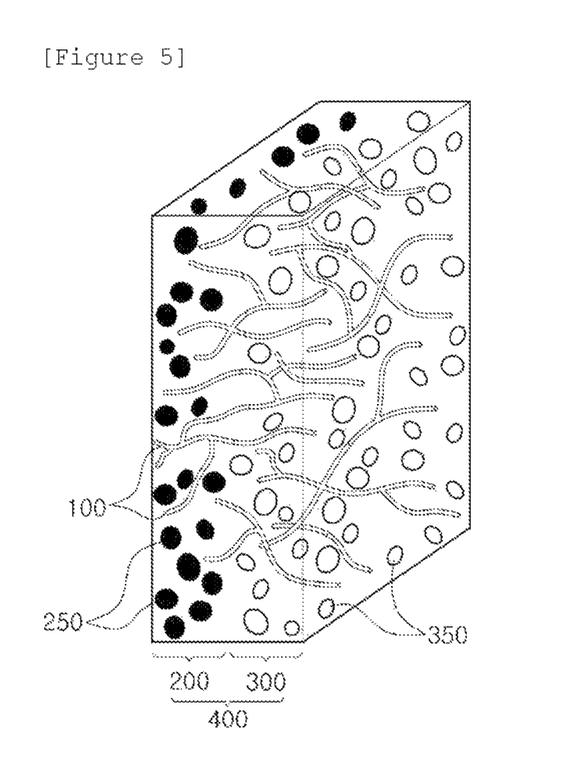
FIG. 5 is a perspective view of an anode according to a fourth exemplary embodiment of the present specification.

As illustrated in FIG. 5, the anode 400 may include a lithium metal layer 200 containing a lithium metal 250 provided inside of pores at one side of a porous current collector 100 and a metal layer or metal oxide layer 300 containing a metal 350 capable of being alloyed with lithium provided inside of pores at the other side of the porous current collector.

The anode may have a thickness of 1 µm or more and 1,000 µm or less. In this case, the thickness of the porous current collector determines the thickness of the anode, and the thickness of the porous current collector may be the same as the thickness of the anode.

The porous current collector is not particularly limited as long as the porous current collector is a base material having pores and a conductor through which current is flowing, and it is possible to select those generally used in the art. For example, the porous current collector may include at least one of conductive polymer, metal, metal oxide, carbon fiber, carbon black, copper, and carbon nanotubes.

The porosity of the porous current collector is not particularly limited, and it is possible to have a porosity of a porous current collector generally used in the art.

The lithium metal layer may include a lithium-metal composite in which a lithium element of the lithium metal layer is bonded to a metal element of the metal layer or metal oxide layer capable of being alloyed with lithium.

In the present specification, when the metal layer or metal oxide layer is a silicon layer containing a silicon element as the metal capable of being alloyed with lithium, the lithium metal layer may include a lithium-silicon composite in which a lithium element of the lithium metal layer is bonded to a silicon element of the silicon layer.

The metal layer or metal oxide layer may be a layer containing a metal capable of being alloyed with lithium. Specifically, the metal layer or metal oxide layer may contain a metal which reacts with lithium to expand the volume thereof.

The metal layer may be a layer containing a metal capable of being alloyed with lithium. Specifically, the metal layer may be a layer composed of only a metal capable of being alloyed with lithium.

The metal oxide layer may be a layer containing a metal oxide capable of being alloyed with lithium. Specifically, the metal oxide layer may be a layer composed of only an oxide of a metal capable of being alloyed with lithium.

A metal which the metal layer or metal oxide layer contains is not particularly limited as long as the metal is a metal capable of being alloyed with lithium, but the metal may include, for example, any one of silicon (Si), tin (Sn), germanium (Ge), and cobalt (Co); an alloy of two or more thereof; or at least one oxide thereof. The metal oxide is not particularly limited as long as the metal oxide contains at least one of silicon (Si), tin (Sn), germanium (Ge), and cobalt (Co), but the metal oxide may be, for example, silicon oxide ($SiO_2$), tin oxide ($SnO_2$), germanium oxide ($GeO_2$), cobalt oxide (CoO, $Co_2O_3$, $CoO_2$, and $Co_3O_4$), and the like.

The metal layer or metal oxide layer may include: any one of silicon, tin, and germanium; an alloy of two or more thereof; or at least one oxide thereof.

The metal layer or metal oxide layer may include a lithium-metal composite in which a lithium element of the lithium metal layer is bonded to a metal element of the metal layer or metal oxide layer capable of being alloyed with lithium.

The metal layer or metal oxide layer may be a silicon layer or silicon oxide layer containing a silicon element as the metal capable of being alloyed with lithium.

The silicon layer or silicon oxide layer means a layer composed of a silicon element or a layer composed of an oxide of a silicon element.

In the present specification, when the metal layer or metal oxide layer is a silicon layer or silicon oxide layer containing a silicon element as the metal capable of being alloyed with lithium, the silicon layer or silicon oxide layer may include a lithium-silicon composite or lithium-silicon oxide composite in which a lithium element of the lithium metal layer is bonded to a silicon element of the silicon layer.

In the anode, the content of a lithium-metal composite formed by alloying the metal or metal oxide with lithium may be affected by the content of the metal or metal oxide capable of being alloyed with lithium. A part or all of the metal or metal oxide capable of being alloyed with lithium included in the anode may be alloyed with lithium to form a lithium-metal composite or lithium-metal oxide composite. The lithium which forms a lithium-metal composite or lithium-metal oxide composite in the anode has an advantage in that stability is high.

When the metal layer or metal oxide layer is a silicon layer containing a silicon element as the metal or metal oxide capable of being alloyed with lithium, the weight ratio of the lithium to the silicon in the anode may be 10 to 100:100.

In the anode, the content of the lithium-silicon composite formed by alloying the silicon with lithium may be affected by the content of a silicon element. A part or all of the silicon element included in the anode may be alloyed with lithium to form a lithium-silicon composite or lithium-silicon oxide composite.

It is possible to further include a lithium-metal composite layer provided between the lithium metal layer and the metal layer or metal oxide layer in pores of the porous current collector.

The lithium-metal composite layer may include a lithium-metal composite or lithium-metal oxide composite formed by meeting a lithium metal element of the lithium metal layer and a metal element of the metal layer or metal oxide layer at the interface between the lithium metal layer and the metal layer or metal oxide layer.

Figure 8:
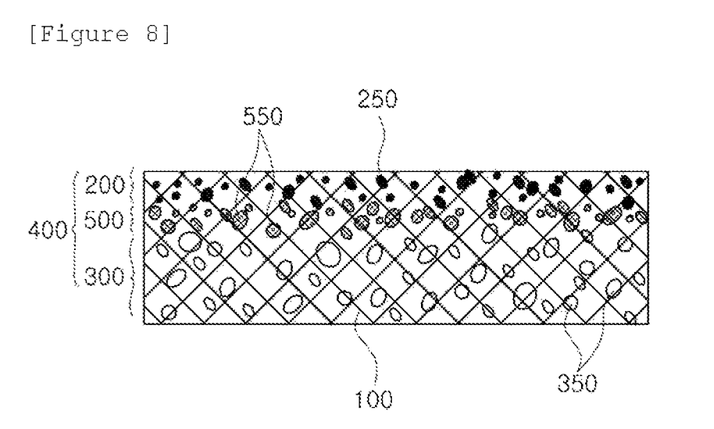
FIG. 8 is a cross-sectional view of an anode according to a seventh exemplary embodiment of the present specification.

As illustrated in FIG. 8, the anode 400 may further include a lithium-metal composite layer 500 provided between the lithium metal layer 200 and the metal layer or metal oxide layer 300 in pores of the porous current collector 100. The lithium-metal composite layer 500 may include a lithium-metal composite or lithium-metal oxide composite 550 formed by meeting an element of a lithium metal 250 of the lithium metal layer 200 and an element of a metal 350 of the metal layer or metal oxide layer 300 at the interface between the lithium metal layer 200 and the metal layer or metal oxide layer 300.

In an exemplary embodiment of the present specification, when the metal layer or metal oxide layer is a silicon layer or silicon oxide layer containing a silicon element as the metal capable of being alloyed with lithium, it is possible to further include a lithium-silicon composite layer provided between the lithium metal layer and the silicon layer or silicon oxide layer in pores of the porous current collector.

The lithium-silicon composite layer may include a lithium-silicon composite or lithium-silicon oxide composite. Specifically, the lithium-silicon composite layer may include a lithium-silicon composite represented by the following Chemical Formula 1 or a lithium-silicon oxide composite represented by the following Chemical Formula 2.

$Li_xSi$            [Chemical Formula 1]

$Li_oSiO_p$            [Chemical Formula 2]

In Chemical Formulae 1 and 2, x is a real number of 1.0 to 4.0, o is each a real number of 0.3 to 4.0, and p is each a real number of 0.1 to 2.0.

In the present specification, the anode may include: a porous current collector in which silicon or silicon oxide, carbon, and a binder resin are provided inside of pores thereof; and a lithium metal layer provided on a surface at one side of the porous current collector and in the pores thereof.

The kinds of carbon and binder resin are not particularly limited, but it is possible to employ those generally used in the art. For example, the binder resin may include polyvinylidene fluoride (PVdF).

The present specification provides an anode including: a porous current collector; and a lithium-metal composite layer in which a metal or metal oxide capable of being alloyed with lithium contains a lithium-metal composite alloyed with lithium in pores of the porous current collector.

The anode may be composed of a lithium-metal composite layer provided inside of pores of the porous current collector.

Figure 6:
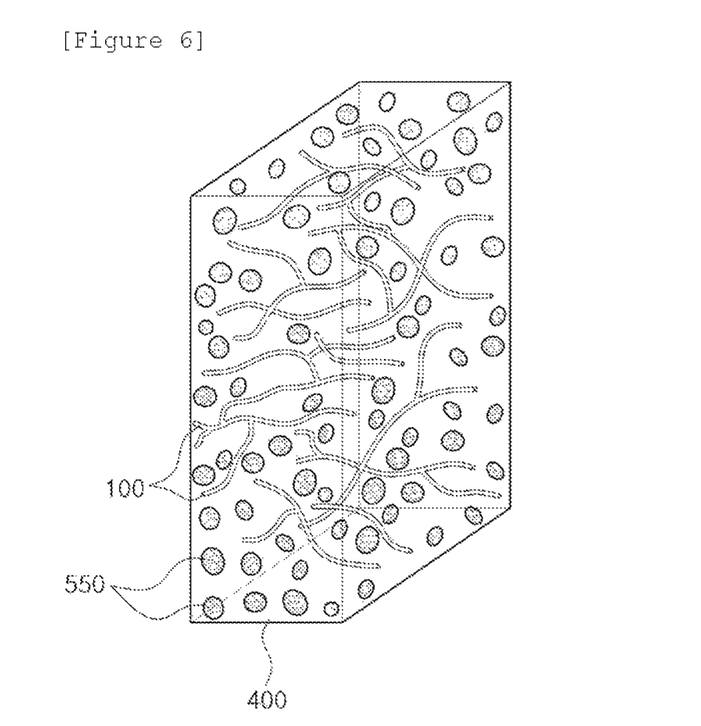
FIG. 6 is a perspective view of an anode according to a fifth exemplary embodiment of the present specification.

As illustrated in FIG. 6, the anode 400 may be composed of a lithium-metal composite layer in which all the inside of the pores of the porous current collector 100 includes a lithium-metal composite or lithium-metal oxide composite 550.

When the lithium metal of the lithium metal layer has a weight which is equal to or less than that of a metal capable of being alloyed with lithium of the metal layer or metal oxide layer, all of the lithium metal of the lithium metal layer may be bonded to a metal element of the metal layer or metal oxide layer, which is capable of being alloyed with lithium, to form a lithium-metal composite layer.

The lithium-metal composite layer may be a lithium-silicon composite layer containing a silicon element as a metal or metal oxide capable of being alloyed with lithium.

When the lithium metal of the lithium metal layer has a weight which is equal to or less than that of the silicon of the silicon layer or silicon oxide layer, all of the lithium metal of the lithium metal layer may be bonded to a silicon element of the silicon or silicon oxide to form a lithium-silicon composite layer. In this case, the anode may be a silicon electrode or silicon composite electrode in which a lithium metal of a lithium metal layer are all eliminated, and a lithium-silicon composite and the remaining silicon or silicon oxide serves as an anode.

The anode may include a porous current collector in which silicon, a lithium-silicon composite, carbon, and a binder resin are provided in the pores thereof.

The anode may include a porous current collector in which silicon oxide, a lithium-silicon oxide composite, carbon, and a binder resin are provided in the pores thereof.

The present specification provides a lithium secondary battery including the anode and the cathode, and an electrolyte provided between the anode and the cathode.

The shape of the lithium secondary battery is not limited, and may be, for example, a coin-type, a flat plat-type, a cylinder-type, a cone-type, a button-type, a sheet-type, or a laminate-type.

The lithium secondary battery may be a lithium air battery. Specifically, a cathode of the lithium secondary battery may be an air electrode.

The lithium secondary battery may be manufactured as a flow battery by further including each tank which stores a cathode electrolytic solution and an anode electrolytic solution and a pump which allows each electrolytic solution to move to an electrode cell.

The electrolyte may be an electrolyte liquid in which the anode and the cathode are impregnated.

The lithium secondary battery may further include a separation membrane provided between the anode and the cathode. As the separation membrane disposed between the anode and the cathode, it is possible to use any separation membrane as long as the separation membrane may separate or insulate the anode and the cathode, and enable ions to move between the anode and the cathode. For example, the separation membrane may be a non-conductive porous membrane or an insulating porous membrane. More specifically, it is possible to exemplify a polymer non-woven fabric such as a non-woven fabric formed of a polypropylene material or a non-woven fabric formed of a polyphenylene sulfide material; or a porous film formed of an olefin-based resin such as polyethylene or polypropylene, and it is also possible to use a combination of two or more thereof.

The lithium secondary battery may further include a cathode electrolytic solution at a cathode side and an anode electrolytic solution at an anode side, which are divided by a separation membrane. The cathode electrolytic solution and the anode electrolytic solution may include a solvent and an electrolytic salt, respectively. The cathode electrolytic solution and the anode electrolytic solution may include solvents which are the same as or different from each other.

The electrolytic solution may be an aqueous electrolytic solution or a non-aqueous electrolytic solution. The aqueous electrolytic solution may include water as a solvent, and the non-aqueous electrolytic solution may include a non-aqueous solvent as a solvent.

As the non-aqueous solvent, those generally used in the art may be selected, and the non-aqueous solvent is not particularly limited, but for example, it is possible to select the non-aqueous solvent from the group consisting of carbonate-based, ester-based, ether-based, ketone-based, organosulfur-based, organophosphorous-based, and non-protonic solvents, and combinations thereof.

The electrolytic salt refers to a salt which is dissociated into a positive ion and a negative ion in water or a non-aqueous organic solvent, and is not particularly limited as long as the electrolytic salt may transfer lithium ions in a lithium secondary battery, and those generally used in the art may be selected.

The concentration of electrolytic salt in the electrolytic solution may be 0.1 M or more and 3 M or less. In this case, charge and discharge characteristics of the lithium secondary battery may be effectively exhibited.

The electrolyte may be a solid electrolyte membrane or a polymer electrolyte membrane.

A material for the solid electrolyte membrane and the polymer electrolyte membrane is not particularly limited, and those generally used in the art may be employed. For example, the solid electrolyte membrane may include a composite metal oxide, and the polymer electrolyte membrane may be a membrane in which a conductive polymer is provided inside a porous base material.

The cathode means an electrode in which when the battery is discharged in the lithium secondary battery, electrons are received and lithium-containing ions are reduced. In contrast, when the battery is charged, the cathode serves as an anode (oxidation electrode), so that a cathode active material is oxidized to release electrons and lose lithium-containing ions.

The cathode may include a cathode current collector and a cathode active material layer formed on the cathode current collector.

In the present specification, a material for the cathode active material of the cathode active material layer is not particularly limited as long as the material is applied together with the anode to a lithium secondary battery, and as a result, lithium-containing ions may be reduced and oxidized during the discharging and during the charging, respectively. For example, the material may be a transition metal oxide, and specifically, may include at least one of $LiCoO_2$, $LiNiO_2$, $LiFePO_4$, $LiMn_2O_4$, $LiNi_xCo_yMn_zO_2$ (here, x+y+z=1), $Li_2FeSiO_4$, $Li_2FePO_4F$, and $Li_2MnO_3$.

The present specification provides a battery module including the lithium secondary battery as a unit cell.

The battery module may be formed by stacking the unit cell as a bipolar plate provided between two or more lithium secondary batteries according to one exemplary embodiment of the present specification.

When the lithium secondary battery is a lithium air battery, the bipolar plate may be porous, such that the air supplied from the outside may be supplied to a cathode included in each of the lithium air batteries. For example, the bipolar plate may include a porous stainless steel or a porous ceramic.

The battery module may be specifically used as a power source for an electric vehicle, a hybrid electric vehicle, a plug-in hybrid electric vehicle, or a power storage device.

The present specification provides a method for manufacturing an anode, the method including: preparing a first anode including a lithium metal layer; preparing a second anode including a metal layer or metal oxide layer containing a metal capable of being alloyed with lithium; and electrically connecting the first anode to the second anode.

The preparing of the second anode may include impregnating a composition including a metal capable of being alloyed with lithium inside pores of a porous current collector.

The preparing of the second anode may further include drying the porous current collector in which the composition is impregnated.

The preparing of the second anode may include: impregnating a silane-based compound inside pores of a porous current collector; and reducing the silane-based compound to form a silicon layer.

The silane-based compound may include hydrogenated silicon ($Si_nH_{2n+2}$) and an organic compound in which a hydrogen atom of the hydrogenated silicon is substituted with a hydrocarbon group, a halogen group, an alkoxy group, and a hydroxy group, and may include, for example, at least one of silane, chlorosilane, dichlorosilane, trichlorosilane, tetraalkylsilane, chlorotrialkylsilane, dichloroalkylsilane, and trichloroalkylsilane, but the silane-based compound is not limited thereto.

In the present specification, the hydrocarbon group is a functional group of an organic compound composed of only carbon and hydrogen, and the hydrocarbon group may be any one group of a straight-chained or branch-chained alkyl group, an alkenyl group, a fluorene group, a cycloalkyl group, and an aryl group, or a group in which two or more groups are linked.

In the present specification, examples of the halogen group include fluorine, chlorine, bromine, iodine, and the like, but are not limited thereto.

In the present specification, the alkoxy group preferably has 1 to 12 carbon atoms, and more specific examples thereof include methoxy, ethoxy, isopropyloxy, and the like, but are not limited thereto.

In the present specification, the alkyl group may be straight-chained or branch-chained, and the number of carbon atoms thereof is not particularly limited, but is preferably 1 to 12. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight-chained or branch-chained, and the number of carbon atoms thereof is not particularly limited, but is preferably 2 to 12. Specific examples thereof include a butenyl group; a pentenyl group; or an alkenyl group to which an aryl group such as a stylbenyl group and a styrenyl group is linked, but are not limited thereto.

In the present specification, the fluorenyl group has a structure in which two cyclic organic compounds are linked to each other through one atom, and examples thereof include and the like.

In the present specification, the fluorenyl group includes the structure of an open fluorenyl group, and herein, the open fluorenyl group has a structure in which the linkage of one ring compound is broken in the structure of two ring compounds linked through one atom, and examples thereof include and the like.

In the present specification, the cycloalkyl group may be monocyclic or polycyclic, and the number of carbon atoms thereof is not particularly limited, but is preferably 6 to 40. Specific examples thereof include a cyclopropyl group, a cyclobutyl group, a cyclopentyl group, a cyclohexyl group, a cycloheptyl group, and the like, but are not limited thereto.

In the present specification, the aryl group may be monocyclic or polycyclic, and the number of carbon atoms thereof is not particularly limited, but is preferably 6 to 40. Examples of the monocyclic aryl group include a phenyl group, a biphenyl group, a terphenyl group, stylbene, and the like, examples of the polycyclic aryl group include a naphthyl group, an anthracenyl group, a phenanthrene group, a pyrenyl group, a perylenyl group, a chrysenyl group, a fluorene group, and the like, but the examples are not limited thereto.

The preparing of the second anode may include impregnating a composition including silicon or silicon oxide inside pores of a porous current collector. Specifically, the preparing of the second anode may include impregnating a composition including silicon or silicon oxide, carbon, and a binder resin inside pores of a porous current collector.

The preparing of the second anode may further include drying the porous current collector in which the composition is impregnated.

The electrically connecting of the first anode to the second anode may be electrically connecting the first anode to the second anode in series or in parallel. Specifically, the electrically connecting of the first anode to the second anode may be electrically connecting the first anode to the second anode by using a connecting part which connects the first anode to the second anode in series or in parallel.

The electrically connecting of the first anode to the second anode may be connecting the first anode to the second anode in parallel. Specifically, the electrically connecting of the first anode to the second anode may be electrically connecting the first anode to the second anode by using a connecting part which connects the first anode to the second anode in parallel.

The method for manufacturing an anode may further include providing an anode separation membrane between the first anode and the second anode.

In the method for manufacturing an anode, the explanation on the first anode, the second anode, the connecting part, and the anode separation membrane may depend from those described above.

The present specification provides a method for manufacturing an anode, the method including: impregnating a composition including a metal or metal oxide containing a metal capable of being alloyed with lithium in a porous current collector; and applying a lithium metal on one surface of the porous current collector in which the composition is impregnated.

The present specification provides a method for manufacturing an anode, the method including: impregnating a composition including silicon or silicon oxide in a porous current collector; and applying a lithium metal on one surface of the porous current collector in which the composition is impregnated.

The composition may further include at least one of a binder resin, a conductive material, and a solvent.

The kinds of conductive material, binder resin, and solvent are not particularly limited, but it is possible to employ those generally used in the art. For example, the binder resin may include polyvinylidene fluoride (PVdF).

The conductive material is a material having conductivity and is not particularly limited, but may be, for example, carbon. The carbon may be one or two or more selected from the group consisting of graphene, graphite, carbon black, carbon nanotubes, carbon fiber, and activated carbon. The carbon black may be acetylene black, Denka black, Ketjen black, or carbon black.

Based on the total weight of the solid content of the composition, the content of the metal or metal oxide containing the metal capable of being alloyed with lithium may be 50 wt % or more and 90 wt % or less, the content of the carbon may be 1 wt % or more and 40 wt % or less, and the content of the binder resin may be 1 wt % or more and 20 wt % or less.

Based on the total weight of the solid content of the composition, the content of the silicon or silicon oxide may be 50 wt % or more and 90 wt % or less, the content of the carbon may be 1 wt % or more and 40 wt % or less, and the content of the binder resin may be 1 wt % or more and 20 wt % or less.

Since the lithium metal is a metal which does not have high strength at normal temperature, a part or all of the lithium metal may enter pores of the porous current collector when the lithium metal is applied while pressing one surface of the porous current collector under a slight pressure. In the applying of the lithium metal, even though a part of the lithium metal enters the pores, all of the lithium metal may enter pores of the porous current collector while time elapses.

Figure 7:
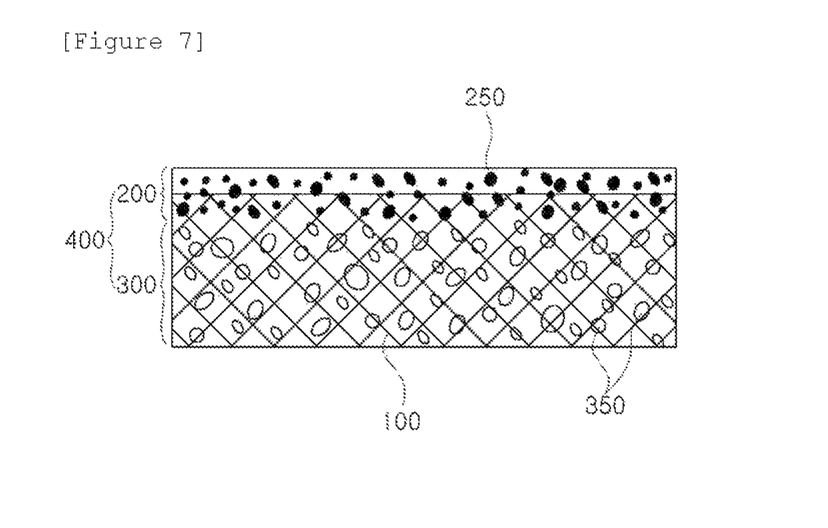
FIG. 7 is a cross-sectional view of an anode according to a sixth exemplary embodiment of the present specification.

As illustrated in FIG. 7, a part of the lithium metal may enter pores of the porous current collector 100 in the applying of the lithium metal 250.

As illustrated in FIG. 5, all of the lithium metal 250 may enter pores of the porous current collector in the applying of the lithium metal, or as illustrated in FIG. 7, in the applying of the lithium metal, even though a part of the lithium metal 250 enters pores, all of the lithium metal 250 may enter pores of the porous current collector 100 while time elapses.

The kinds of binder and conductive material are not particularly limited, but it is possible to select those generally used in the art.

In the method for manufacturing an anode, the explanation on the porous current collector, the lithium metal, and the metal or metal oxide containing a metal capable of being alloyed with lithium may depend from those described above.

MODE FOR INVENTION

Hereinafter, the present specification will be described in more detail through Examples. However, the following Examples are provided only for exemplifying the present specification, but are not intended to limit the present specification.

EXAMPLES

Example 1

A composition having a weight ratio of $LiCoO_2$ (LCO), Denka black, and PVdF of 95:2.5:2.5 was applied on an aluminum foil (thickness: 15 μm) as a current collector to manufacture a cathode.

A lithium foil having a thickness of 40 μm was used as a first anode.

A composition having a weight ratio of SiO, Denka black, and PVdF of 70:20:10, respectively was impregnated in a copper foam (thickness: 300 μm) as a current collector to manufacture a second anode.

A battery cell including the cathode and the first and second anodes was manufactured by using a carbonate-based electrolytic solution including Li salt.

Example 2

A composition having a weight ratio of $LiCoO_2$ (LCO), Denka black, and PVdF of 95:2.5:2.5 was applied on an aluminum foil (thickness: 15 μm) as a current collector to manufacture a cathode.

A composition having a weight ratio of SiO, Denka black, and PVdF of 70:20:10, respectively, was impregnated in a copper foam (thickness: 300 μm) as a current collector, and then a lithium metal layer was formed on one surface thereof to have a thickness of 40 μm from a lithium metal by a roll press process to manufacture an anode.

A battery cell including the cathode and the anode was manufactured by using a carbonate-based electrolytic solution including Li salt.

Comparative Example 1

A battery cell was manufactured by using only the first anode of Example 1 as an anode.

Comparative Example 2

A battery cell was manufactured by using only the second anode of Example 1 as an anode.

Experimental Example 1

The battery cells of Examples 1 and 2 and Comparative Examples 1 and 2 were charged and discharged 150 times under the following charging and discharging conditions to measure charging and discharging cycle characteristics of the battery according to the number of charging and discharging. The results are illustrated in FIGS. 4 and 9.

Charging conditions: 0.2 C rate CC/CV, 4.2V, 5% current cut-off at 1 C

Discharging conditions: 0.2 C rate CC, 3V cut-off (CC: Constant Current, CV: Constant Voltage)

Figure 4:
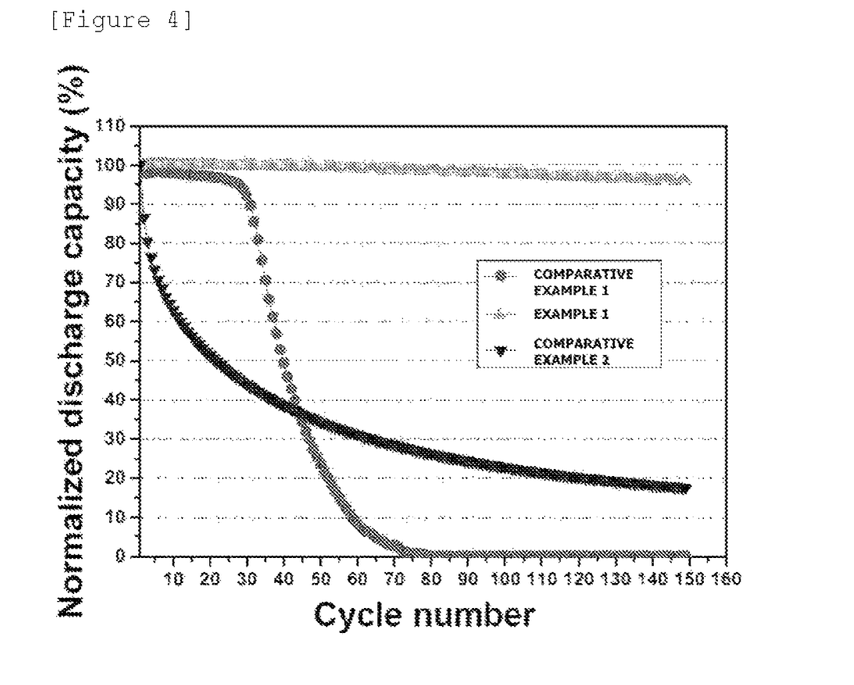
FIG. 4 is a capacity retention rate graph according to the number of charging and discharging in Example 1 and Comparative Examples 1 and 2.
Figure 9:
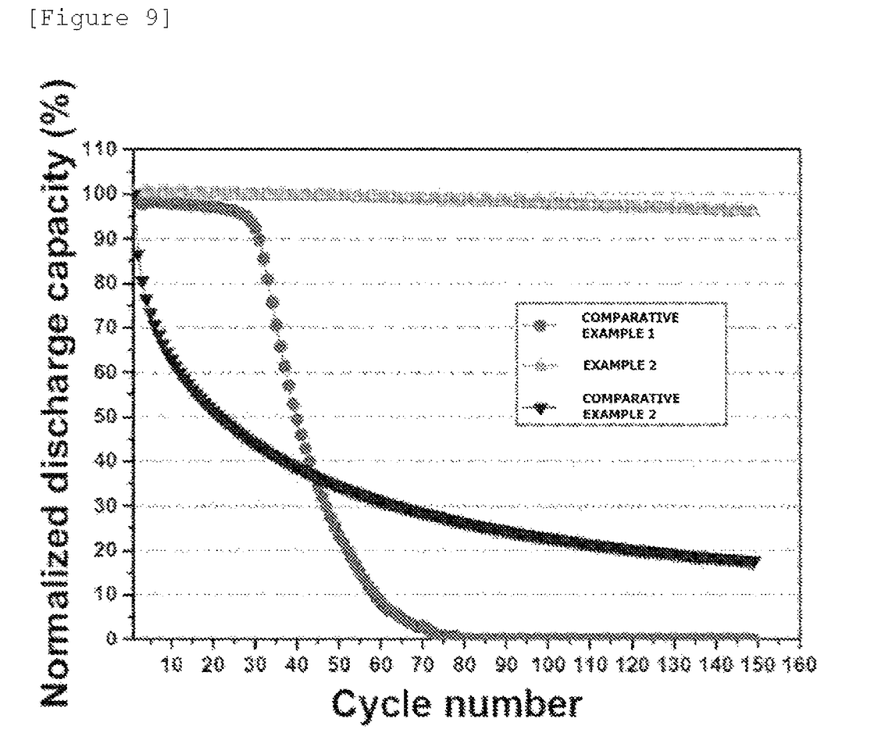
FIG. 9 is a capacity retention rate graph according to the number of charging and discharging in Example 2 and Comparative Examples 1 and 2.

Through FIGS. 4 and 9, it can be seen that when Example 1 or 2 is applied, a capacity retention rate of 95% is exhibited at 150 cycles.

The invention claimed is:

1. A lithium secondary battery comprising:
   a cathode;
   an anode comprising:
   a first anode having a first anode composition comprising a lithium metal layer; and
   a second anode having a second anode composition comprising a porous current collector, and silicon or silicon oxide, carbon, and a binder resin provided in pores of the porous current collector, and
   an anode separation membrane provided between the first anode and the second anode,
   wherein the anode separation membrane has a first surface and a second surface that is opposite to the first surface,
   wherein the first anode is in contact with the first surface of the anode separation membrane and the second anode is in contact with the second surface of the anode separation membrane,
   wherein the first anode and the second anode are electrically connected to each other,
   wherein the first anode composition is different from the second anode composition, and
   wherein a weight ratio of a lithium element of the first anode to a silicon element of the second anode is 10 to 130:100; and
   an electrolyte provided between the anode and the cathode.

2. The lithium secondary battery of claim 1, wherein the second anode further comprises a lithium-silicon composite or lithium-silicon oxide composite provided in pores of the porous current collector.

3. The lithium secondary battery of claim 2, wherein the lithium-silicon composite is represented by the following Chemical Formula 1, and the lithium-silicon oxide composite is represented by the following Chemical Formula 2:

$Li_xSi$     [Chemical Formula 1]

$Li_oSiO_p$     [Chemical Formula 2]

in Chemical Formula 1 and 2, x is a real number of 1.0 to 4.0, o is each a real number of 0.3 to 4.0, and p is each a real number of 0.1 to 2.0.

4. The lithium secondary battery of claim 1, further comprising:
   a separation membrane provided between the anode and the cathode.

5. A battery module comprising the lithium secondary battery of claim 1 as a unit cell.

* * * * *